United States Patent [19]

Hunke

[11] E Patent Number: Re. 33,492

[45] Reissued Date of Patent: Dec. 18, 1990

[54] APPARATUS FOR COOLING AND GRANULATION OF THERMOPLASTIC STRANDS

[75] Inventor: Friedrich Hunke, Grossostheim, Fed. Rep. of Germany

[73] Assignee: Automatik Apparate-Maschinenbau GmbH, Fed. Rep. of Germany

[21] Appl. No.: 393,562

[22] Filed: Aug. 14, 1989

Related U.S. Patent Documents

Reissue of:

[64] Patent No.: 4,632,752
Issued: Dec. 30, 1986
Appl. No.: 657,207
Filed: Oct. 3, 1984

[30] Foreign Application Priority Data

Oct. 4, 1983 [DE] Fed. Rep. of Germany ..... 3336032

[51] Int. Cl.[5] ..... B01D 35/28; B29C 47/88

[52] U.S. Cl. ..... 210/173; 210/512.1; 241/65; 241/68; 425/71; 425/72.1; 425/308; 425/378.1

[58] Field of Search ..... 210/173, 175, 512.1, 210/512.3; 425/71, 72, 308, 378; 241/23, 27, 65, 68, 69

[56] References Cited

U.S. PATENT DOCUMENTS

| | | | |
|---|---|---|---|
| 1,740,029 | 12/1929 | Moomy | 425/71 |
| 2,245,640 | 6/1941 | Beattie | 425/71 |
| 2,587,619 | 3/1952 | Hofmann | 425/71 |
| 2,962,565 | 11/1960 | Schlicksupp | 55/337 |
| 3,199,213 | 8/1965 | Milligan et al. | 34/155 |
| 3,760,458 | 9/1973 | Pitt | 28/283 |
| 3,819,793 | 6/1974 | Elliott | 425/71 |
| 3,843,060 | 10/1974 | Colburn | 254/118 |
| 3,988,085 | 10/1976 | Krchma | 425/71 |
| 4,025,252 | 5/1977 | Hunke | 425/71 |
| 4,180,539 | 12/1979 | Clarke | 425/71 |
| 4,485,060 | 11/1984 | Franz et al. | 264/118 |
| 4,528,157 | 7/1985 | Lettner et al. | 425/71 |

FOREIGN PATENT DOCUMENTS 1390614 4/1975 United Kingdom .

*Primary Examiner*—Willard Hoag
*Attorney, Agent, or Firm*—Niro, Scavone, Haller & Niro

[57] ABSTRACT

Apparatus for cooling thermoplastic strands issuing from an extrusion die, the apparatus including a cooling trough between the extrusion nozzle and the granulator. The trough has two coolant drainage regions, a first being connected to a gravity drain and a second having means applying air downward through apertures in the trough. A conical separator for granulate is provided following the granulator.

17 Claims, 2 Drawing Sheets

APPARATUS FOR COOLING AND GRANULATION OF THERMOPLASTIC STRANDS

Matter enclosed in heavy brackets [ ] appears in the original patent but forms no part of this reissue specification; matter printed in italics indicates the additions made by reissue.

BACKGROUND OF THE INVENTION

This invention relates to the cooling and granulation of molten thermoplastic strands which emerge from nozzles and the generation of dry granulate. For that purpose a slanted drainage trough can have its upper end disposed below the nozzles; with a granulator following in sequence beyond the lower end of the drainage trough. A stream of coolant is generated on the drainage trough, and the strands move from the lower end of the trough into the granulator.

Such a device is shown in FIGS. (5) and (6) of German Auslegeschrift No. 2 218 210, which also discloses means to induce drying. In accordance with FIGS. (5) and (6) a net-like transport belt is employed to receive wet granulate delivered by the granulator. While the granulate is being moved by the transport belt, it looses adherent water by the action of gravity.

Another method of drying disclosed in the Auslegeschrift directs the net-like transport belt between the end of the drainage trough and the entry of the granulator at an upward slant. A blower is disposed above the transport belt and directed towards it. Under the action of this blower, the granulate conveyed by the transport belt has adherent water blown away.

SUMMARY OF THE INVENTION

The invention is based on the simplification of the foregoing device and the improvement of drying efficiency. According to the invention, this is achieved by modifying the drainage trough, before its lower end, by providing in the drainage direction, two successive zones that have penetrations. These penetrations permit the free movement of the cooling fluid. The first zone, as viewed in the drainage direction provides fluid drainage. The second zone has an air stream applied to it that runs essentially in the direction of gravity.

With this arrangement, the two zones for the extraction of coolant are integrated into the drainage trough, specifically by virtue of the fact that the trough is provided before its end with the two zones. Because of the subdivision into two zones, an especially high intensity of water extraction is obtained. The reason appears to be that the first zone drains the main portion of liquid adhering to the strands, solely as a consequence of unimpeded drainage of the cooling fluid and the utilization of the cheapest available energy, namely gravity. Consequently, in the following zone, only a small amount of residual liquid has to be removed. The air stream which runs in the direction of gravity can therefore act with particular intensity. As a consequence, a design is obtained which is easily understood and implemented. In addition especially favorable preconditions for water extraction are achieved by the subdivision into two zones. A particularly favorable effect results from the fact that, in the second zone, only a relatively small amount of liquid has to be removed. This facilitates the generation of the air stream and results in a correspondingly low consumption of energy.

The air stream in the second zone is suitably generated using an exhaust.

There are various forms for the penetrations in the two zones. It is advantageous to form the penetrations by screens. But is is also possible to form the penetrations by intermediately spaced rods disposed in parallel.

To intensify the separation of fluid in the first zone the drainage trough has a curvature leading to the first zone. Because of the curvature, the stream of coolant is deflected in a curved direction perpendicular to the first zone, so that the coolant in the first zone does not glide over the zone and bounce off the penetrations. Because of the curvature, the coolant is applied directly to the penetrations, preferably at 90° to the surface of the zone. The first zone thus offers a lower resistance to the coolant flowing into it.

The above-described withdrawal of coolant, especially water, before granulation of the plastic strands makes it possible-in the event of stringent requirements on the level of drying the granulate-to connect a dryer to the granulator. The action of the dryer is especially intense if the granulate has already been largely predried. For that purpose, the outlet of the granulator empties into an air intake channel, which is connected to a covered, funnel-shaped housing. The connection is approximately tangential to the lower cone portion of the housing. The speed of the air intake is chosen so that the granulate carried by the air stream impinges upon the interior wall of the cone, is reflected several times towards the cover, and deflected from the cover to a funnel outlet.

Because of the funnel-shaped design of the housing, the granulate which impinges on the interior wall of the cone is deflected towards the cover, and counter to gravity. It is thus multiply reflected and finally reaches the cover, from which it is reflected downwardly to the funnel outlet, after being possibly subjected to further reflections at the interior wall of the cone. Because of this design, the granulate remains within the housing for an appreciable time. As a result, there is a high degree of extraction of any further coolant which may remain adherent on the granulate.

During the drying process, both before and after granulation, the heat stored in the granulate is used to cause evaporation of coolant adhering to the granulate. The result of the additional drying and the use of the funnel-shaped housing is that the granulate can be produced with a residual moisture content of less than 0.05% (weight percent of residual water relative to the total weight of the granulate).

To provide suitable air permeation of the housing, it is suitably designed with a screen over at least a part of its surface. In this way the air stream applied to the housing can escape without hindrance. Furthermore, this promotes the removal of water residues when the granulate impinges on the interior wall of the housing.

DESCRIPTION OF THE DRAWINGS

Embodiments of the invention are shown in the drawings, as follows.

DETAILED DESCRIPTION

Figure 1:
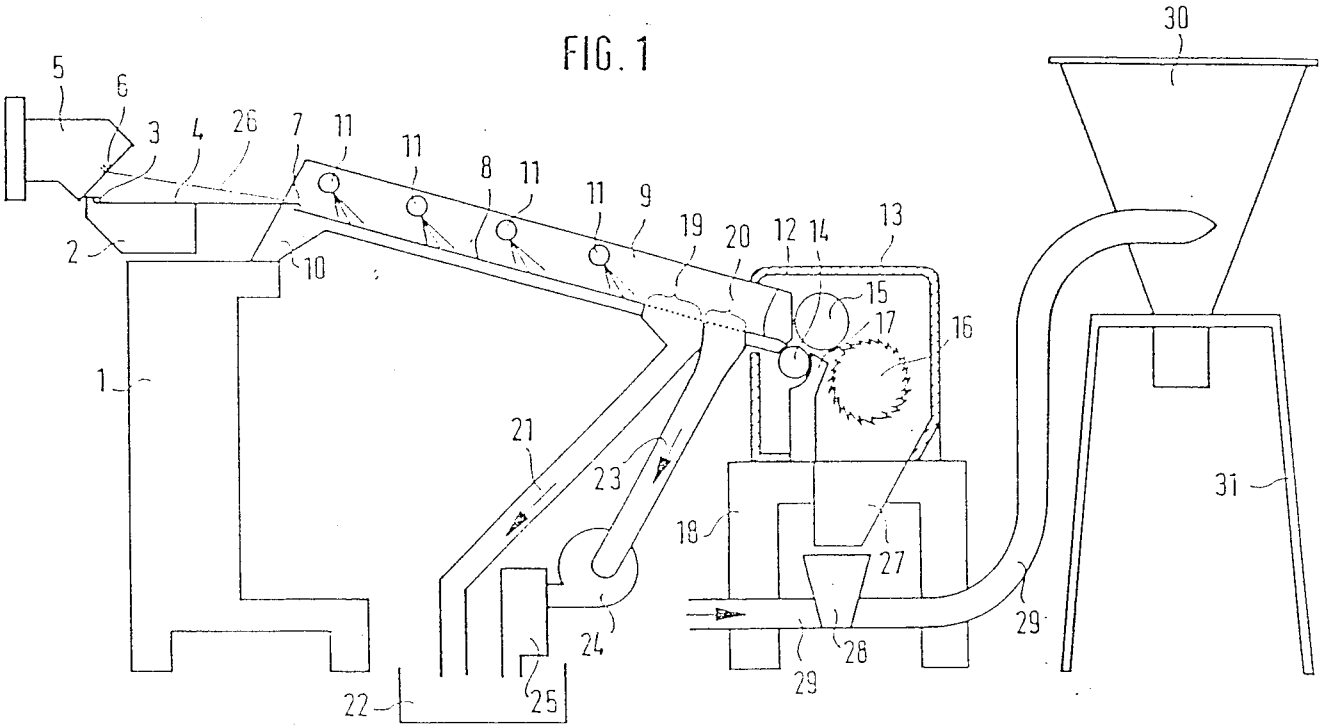
FIG. 1 is a side view of a basic representation of an entire system for cooling and granulating thermoplastic strands.

As shown in FIG. 1, a device according to the invention includes a frame 1, with a reservoir 2 containing coolant provided in a well known manner. (See, e.g. FIG. 1 of Auslegeschrift No. 2 503 455). Water is a suitable coolant. The coolant flows from a slotted nozzle 3 onto a drainage table 4 and then as a fluid film which carries thermoplastic strands which strike the drainage table 4. The nozzle packet 5 is disposed above the drainage table 4. The design of such a nozzle packet can be found, for example, in FIG. 4 of German Offenlegungsschrift No. 2 218 210. Only one nozzle 6 is shown. Molten thermoplastic is applied to the nozzle packet 5 in a manner well known. Molten thermoplastic is extruded from the nozzles, including nozzle 6. The device shown in FIG. 1 has several nozzles 6 disposed successively in linear alignment.

Strands emerging from the nozzle 6 first fall on the drainage table 4 and are carried along by the water film from the drainage table 4, until they reach the end 7 of the drainage table 4 where they enter the drainage trough 8. The strands then slide down the drainage trough 8 in an approximately parallel arrangement, as shown in the above-mentioned Offenlegungsschrift No. 2 218 210. The drainage trough 8 is held in a housing 9. The left side of the housing 9 is supported over a boom 10 on the frame 1. Four spray nozzles 11 are disposed within the housing 9. If necessary, they spray additional coolant, especially water, onto the drainage trough 8 and thus increase the cooling effect exerted on the plastic strands.

The lower end 12 of the drainage trough 8 applies the sliding plastic strands to the granular 13 mounted on a strand 18. The granulator 13 contains the two pull-in rollers 14 and 15, as well as a blade roller 16. The blade roller works against a counterblade 17 which simultaneously acts as a feed-in table. This structural design of the granulator is well known.

Before its lower end 12, the drainage trough 8 has two successive zones with penetrations, which allow the unimpeded flow of coolant. These zones are respectively a first zone 19 and a second zone 20. The penetrations are shown in FIG. 1 as an extension of the drainage trough 8 in dotted lines. Screens are used over which the plastic strands can slide down as they are fed from the drainage trough 8. The screens preserve the character of the drainage trough 8 in the zones 19 and 20 for the plastic strands. However, because of their penetrations, i.e. apertures, they assure that water as a cooling fluid can pass through. The water first reaches the first zone 19 where, under the action of gravity, it flows to drainage 21 which leads to a collection basin 22. From there, after being purified, the drainage water is recirculated to the water reservoir 2 in well-known fashion. In this way, by means of the first zone 19, the major portion of the cooling water is drained away from the trough 8. The water which then still adheres to the plastic strands is largely eliminated by means of the second zone 20. This zone likewise consists of a screen and, via the air hose 23, is connected to the exhaust 24. The exhaust 24 suctions air at high speed through the screen of the second zone 20. Residual water remaining on on the strands is thus largely pumped away. The exhaust 24 is connected to a demister 25, which separates water droplets contained in the incoming air stream and deposits them in the collecting basis 22.

Due to the seizing action of the pull-in rollers 14 and 15, the plastic strands are pulled tightly over the drainage trough 8. The strands above the drainage table 4 thereby adopt the position indicated by dot-dashed line 26.

The granulate of the granulator 13 passes over a discharge outlet 27 to a funnel 28. An air intake channel 29 extends into the funnel 28. The air intake channel then continues through the funnel 28. Thus, by injector means in the funnel, which are provided in well-known fashion, air flowing through the intake channel 29 is prevented from escaping laterally from the funnel 28. The air stream that is carried in the air intake channel 29 is applied to a funnel-shaped housing 30, which is used as an after-dryer, and is described in detail in connection with FIG. 3. The funnel-shaped housing 30 rests on a frame 31.

By the device shown in FIG. 1, plastic strands which emerge in a molten state from nozzles 6 are cooled by coolant in the drainage trough 8. At least as regards their surface, the strands are brought into a solid state to such an extent that, behind the drainage trough 8, it is possible to granulate the plastic strands by the granulator 13. Here, the two zones 19 and 20 already largely remove the cooling water before the granulator 13. Cooling water residues which still remain on the granulate are then removed almost completely in the funnel-shaped housing 30. The air stream which is applied through the air intake channel 29 carries along the granulate into the housing 30. The granulate finally emerges from the outlet 32 of the funnel-shaped housing.

Figure 2:
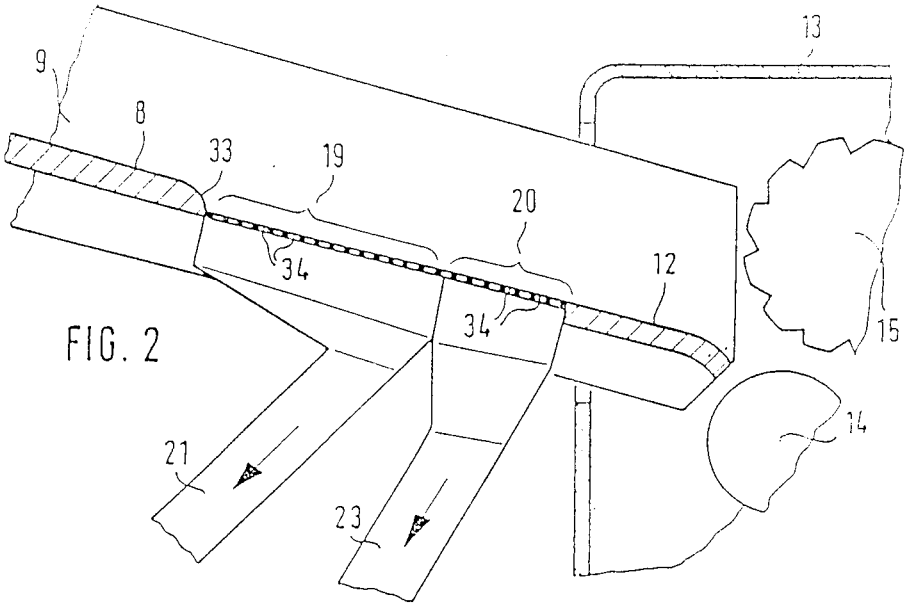
FIG. 2 is a section of the system according to FIG. 1 showing first and second zones for removal of coolant.

FIG. 2 shows an enlarged section from FIG. 1 essentially of zones 19 and 20. As indicated in FIG. 2, the drainage trough 8 extends into the first zone 19 over curvature 33. As a result, the cooling water which flows in over the drainage trough 8 in the direction towards the first zone 19 is deflected corresponding to the radius of curvature of the curve 33. This deflection is due to the adherence properties of the cooling water. As a result, the cooling water encounters the first zone essentially in the transverse direction. Because of this directional change, the throughflow resistance that would otherwise exist in the individual penetrations 34 in the first zone 19 is ineffective, as would be the case if the cooling water were to flow into these penetrations substantially in the direction of the surface of the first zone 19.

In the arrangement shown in FIG. 2, the penetrations 34 in the zones 19 and 20 are shown as drawing points. They are intended to depict an arrangement of rods that are disposed parallel to one another with an intermediate spacing, and are provided instead of screens. The rods are transverse to the pull-off direction of the plastic strands.

Figure 3:
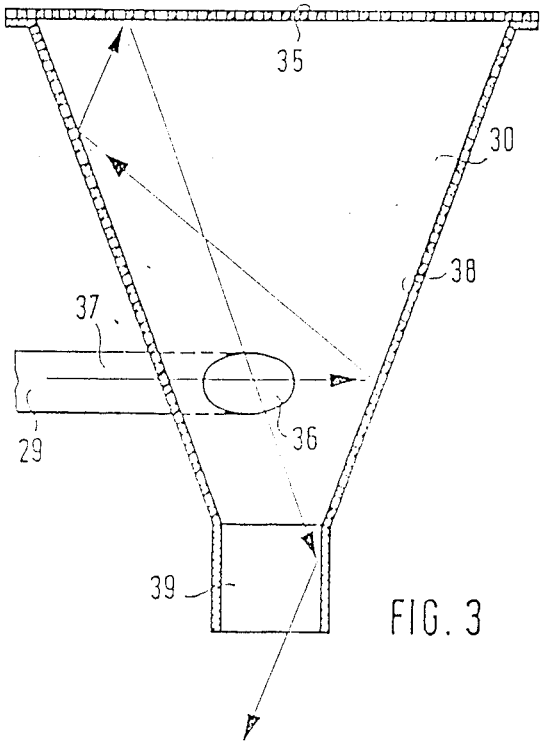
FIG. 3 is an enlargement of the funnel-shaped dryer housing of FIG. 1.

The post-separator shown in FIG. 3 consists of a funnel-shaped housing 30 with a cover 35 and the inlet stud 36, to which is connected to the air intake channel 29. The inlet stud 36 contacts the housing 30 approximately tangentially in the lower half of its conical surface. The granulate is thrown into the housing 30 in the direction of the arrow 37. It strikes the interior wall of the cone 38. Due to the angle of the cone 38 it is thrown counter to gravity, so that it strikes the cover 35 after multiple reflections. Depending on the striking angle of the interior wall of the cone 38, several additional reflections can result. The granulate finally strikes the cover 35. From there, it is reflected downwardly and leaves the housing 30 through the outlet 39. Since the granulate is practically free of water when it enters the funnel-shaped housing 30, it is possible to remove even the last residue from the granulate. This is due to the multiple reflections and intense flushing with air. In FIG. 3, the funnel-shaped housing 30 is provided with a screen-like wall, which facilitates the air movement and, where necessary, the ejection of residual water. It is also possible to construct the housing of non-perforated sheet metal.

Other aspects of the invention will be apparent to those of ordinary skill in the art.

What is claimed is:

1. A device for cooling and granulating molten thermo-plastic strands which emerge from nozzles, and for producing dried granulate, which comprises a slanted drainage trough having an upper end disposed below the nozzles;

a granulator disposed beyond the lower end of said drainage trough for receiving said strands from said trough; and means for providing a flow of coolant on said trough; and about said strands emerging from said nozzles moving on said trough;

said drainage trough having before its lower end in the drainage direction, two successive portions with means allowing the unimpeded drainage of said coolant, with said first portion connected to a drain and the second portion having means for providing an air stream in a gravitational direction through said trough.

2. A device according to claim 1, characterized in that said second portion is connected to an exhaust means.

3. A device according to claim 1, characterized in that said apertures are formed by screens.

4. A device according to claim 1, characterized in that the apertures are formed by intermediately spaced rods disposed in parallel.

5. A device according to claim 1, characterized in that said drainage trough has a curved surface leading to said first zone.

6. A device according to claim 1, characterized in that said granulator has an outlet leading to a covered, funnel-shaped housing with an air intake channel connected tangentially to the lower half of its cone portion, with means for providing an with air speed in the air intake channel being proportioned such that granulate carried by said air stream encounters an interior wall of the cone, is reflected a plurality of times in the direction of said cover, and is deflected by said cover to an outlet of said funnel.

7. A device according to claim 6, characterized in that the cover of said housing includes a sieve.

8. A device according to claim 2, characterized in that said aperture are formed by screens.

9. A device according to claim 2, characterized in that the aperture are formed by intermediately spaced rods disposed in parallel.

10. A device according to claim 2, characterized in that said drainage trough has a curved surface leading to said first zone.

11. A device according to claim 3, characterized in that said drainage trough has a curved surface leading to said first zone.

12. A device according to claim 4, characterized in that said drainage trough has a curved surface leading to said first zone.

13. A device according to claim 2, characterized in that said granulator has an outlet leading to a covered, funnel-shaped housing with an air intake channel connected tangentially to the lower half of its cone portion, with means for providing air speed in the air intake channel being proportioned such that granulate carried by said air stream encounters an interior wall of the cone, is reflected a plurality of times in the direction of said cover, and is deflected by said cover to an outlet of said funnel.

14. A device according to claim 3, characterized in that said granulator has an outlet leading to a covered, funnel-shaped housing with an air intake channel connected tangentially to the lower half of its cone portion, with means for providing air speed in the air intake channel being proportioned such that granulate carried by said air stream encounters an interior wall of the cone, is reflected a plurality of times in the direction of said cover, and is deflected by said cover to an outlet of said funnel.

15. A device according to claim 4, characterized in that said granulator has an outlet leading to a covered, funnel-shaped housing with an air intake channel connected tangentially to the lower half of its cone portion, with means for providing air speed in the air intake channel being proportioned such that granulate carried by said air stream encounters an interior wall of the cone, is reflected a plurality of times in the direction of said cover, and is deflected by said cover to an outlet of said funnel.

16. A device according to claim 5, wherein the outlet of said granulator is connected by an air intake channel to a funnel shaped covered housing, said channel entering the lower portion of said housing tangentially and means for providing an air stream in the intake channel such that said granulate carried by said air stream encounters an interior wall of the cone, is reflected a plurality of times in the directions of said cone and is deflected by said cone to an outlet of said funnel.

17. In an apparatus for producing a dried granulate from molten thermoplastic strands, the improvement comprising:

a cooling trough for receiving said strands and applying coolant thereto;

said trough having a first region with means for drainage of a portion of said coolant from said strands by gravity and a second region having means for directing a gas stream for the removal of a further portion of said coolant from said strands through said second region of said trough.

* * * * *